Figures 4, 5, 6:
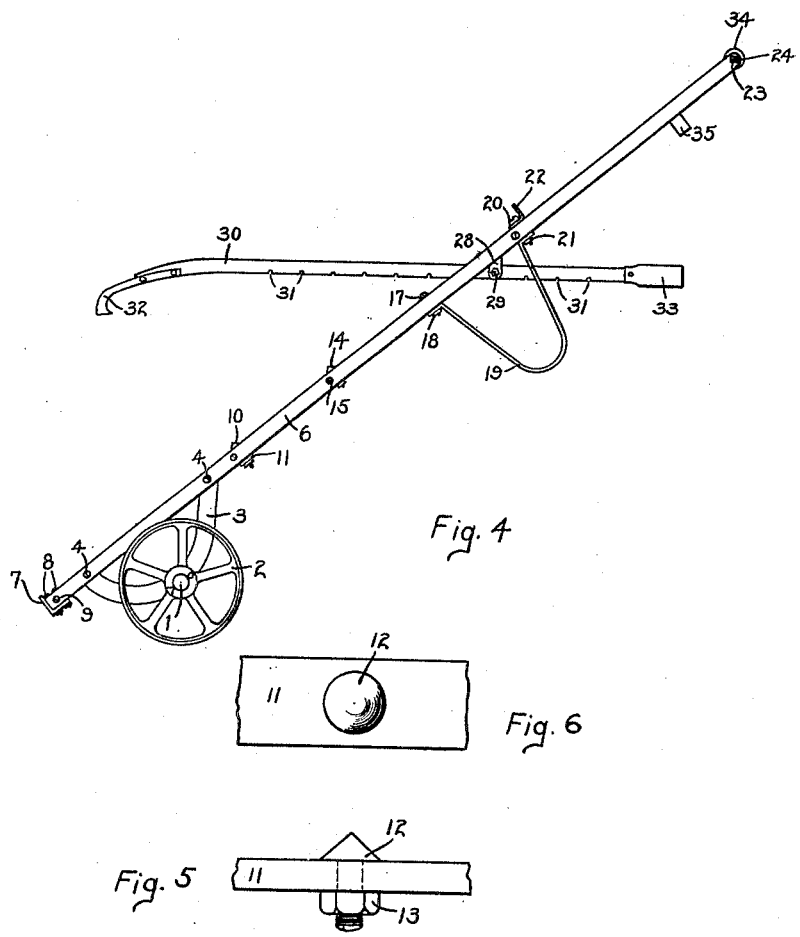

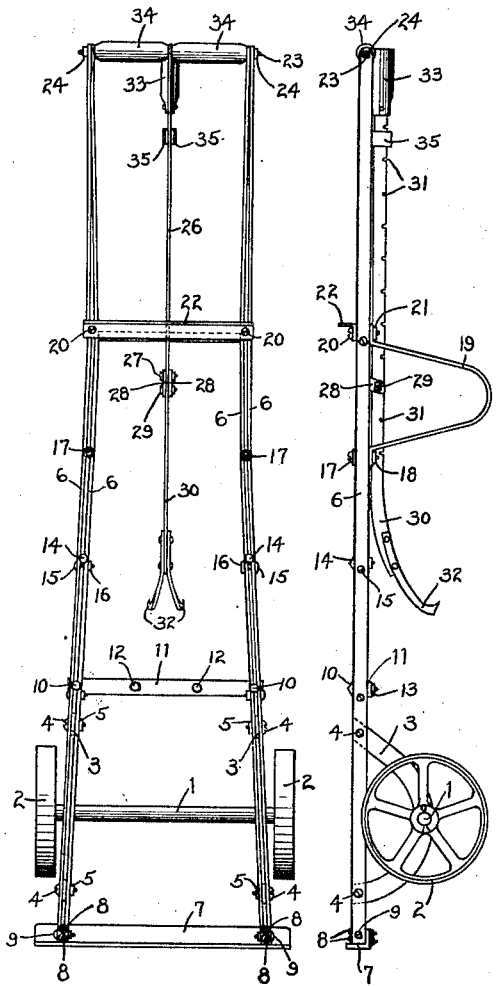
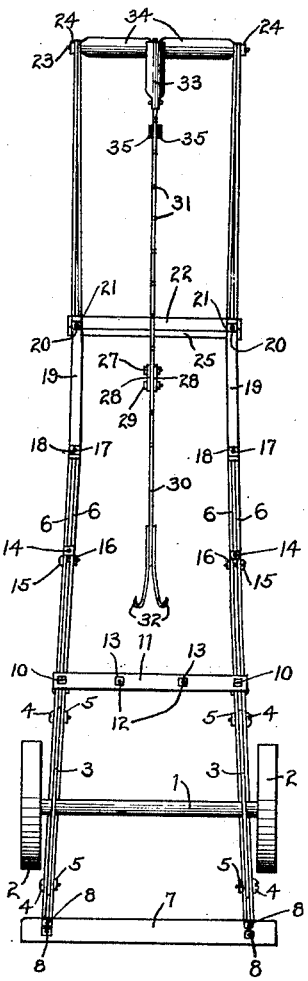

B. E. WILLETT.
HAND TRUCK.
APPLICATION FILED APR. 6, 1918.

1,326,556.

Patented Dec. 30, 1919.
2 SHEETS—SHEET 2.

WITNESSES:

INVENTOR.
Benedict E. Willett
BY
Howard S. Smith,
ATTORNEY.

UNITED STATES PATENT OFFICE.

BENEDICT E. WILLETT, OF DAYTON, OHIO.

HAND-TRUCK.

1,326,556.	Specification of Letters Patent.	Patented Dec. 30, 1919.

Application filed April 6, 1918. Serial No. 226,985.

*To all whom it may concern:*

Be it known that I, BENEDICT E. WILLETT, a citizen of the United States, residing at Dayton, in the county of Montgomery and State of Ohio, have invented a new and useful Improvement in Hand-Trucks, of which the following is a specification.

The principal object of the invention is to provide a simple, strong and durable truck provided with an extensible gripping or tentacle device for readily drawing or pulling barrels, boxes and other objects on the truck in stores, warehouses and other places. In other words, my improved gripping device performs in much less time and with materially less effort, the work formerly performed by the hand in pulling or drawing a heavy barrel, box or bag onto the truck prior to its movement to another position.

The preferred form of embodiment of my invention is illustrated in the accompanying drawings, of which Figure 1 is a top plan view of my improved hand truck. Fig. 2 is a side elevational view thereof; Fig. 3 is a bottom plan view of said truck; Fig. 4 is a side elevational view of the truck, showing the tentacle arm in a position to engage a barrel, bag or box for the purpose of drawing it upon the truck; Fig. 5 is a side elevational view of one of the gabled gripping or engaging devices provided on the side and cross bars of the truck to prevent the barrel, box or bag thereon from slipping; and Fig. 6 is a top plan view of one of said devices.

Throughout the specification and drawings, similar reference characters denote corresponding parts.

In a detailed description of the preferred form of embodiment of my invention, the numeral 1 designates an axle shaft upon which are loosely mounted two truck wheels 2, 2. The axle shaft 1 passes through, and is supported by, two semi-elliptical members 3, 3 each one of which has its ends secured, by means of screw bolts 4 and nuts 5, between a pair of side bars 6, 6. These two pair of side bars incline outwardly at the front portion of the truck where an angle iron 7 is connected to them by a pair of upright bolts 8, 8 which straddle a transverse bolt 9 that passes through the end portions of each pair of side bars 6, 6. This form of connection has been found to be a particularly strong one.

Connected to the under side of each pair of side bars 6, 6, by means of bolts 10 having their upper ends gable-shaped in cross section for a purpose to be hereinafter described, is a cross member 11. The latter is positioned a short distance behind the truck wheels 2, 2, and passing through it are preferably two bolts 12, 12, the upper ends of which are gable-shaped in cross section while their lower ends are threaded to receive nuts 13. (See Figs. 1, 5 and 6). The gable-shaped ends of the bolts 10 and 12 are designed to engage the barrel, box or other object to hold it firmly on the truck during the raising operation, and thereafter, without gouging holes in it. For a similar purpose a pair of gable bolts 14 are secured to the side bars 6, 6 a short distance behind the cross member 11, each pair of side bars 6, 6 being made to firmly grip its respective bolt 14, by a transverse bolt 15 and nut 16 that draws them together at that point.

A short distance behind each bolt 14 there is secured to the under side of each pair of side bars 6, 6 by means of a bolt 17 and nut 18, the forward end of a U-shaped supporting piece 19 to support the rear portion of the truck when the latter is in the horizontal position shown in Fig. 2. The rear end of each U-shaped supporting piece 19 is secured to the under side of its respective pair of side bars 6, 6 by a bolt 20 which passes between them and that receives on its lower threaded end a nut 21. The bolts 20 also pass through, and secure to the upper sides of the side bars 6, 6, an angle iron 22.

The two pairs of side bars 6, 6 extend a sufficient distance behind the angle iron 22 to provide handle portions for the operator of the truck. Passing through the extreme rear ends of the side bars 6, 6, is a rod 23 threaded at both ends to receive a nut 24. Connected to the middle portion of the rod 23 and a rod 25 secured to the side bars 6, 6 below the angle iron 22, is a middle bar 26 to whose front end there are pivoted, by means of a bolt 27, a pair of short links 28, 28 through whose outer ends a bolt 29 passes. These links 28, 28 are adapted to swing back and forth on the bolt 27, to make the bolt 29 which they carry an oscillating fulcrum for a tentacle arm 30 having notches 31 provided in its under surface, each one of which is adapted to receive the bolt 29. Fixedly secured to the front end of the arm 30 are two outwardly and downwardly curved hook or claw-shaped pieces 32, 32, having pointed ends adapted to firmly engage the side of a barrel, box or bag. Secured to the rear end of the arm 30 is a handle portion 33. A roller shaped handle portion 34 is also fitted on the rod 23, on each side of the bar 26. Depending downwardly from the latter, a short distance from its upper end, is a pair of spring clips 35, 35 adapted to receive, and firmly hold, the rear end of the arm 30 when the same is not in use. (See Figs. 1, 2 and 3).

When it is desired to use the truck, it is preferably placed to bring the angle iron 7 against the lower end of the barrel, box or other object to be moved. The tentacle arm 30 is then withdrawn from the clips 35, 35 and longitudinally adjusted to bring that notch 31 over the bolt 29, which will permt the claw-shaped ends 32 of the arm to easily reach over the top of the object to be moved and engage its far side. The arm 30 is then pushed forwardly by its handle portion 33 to hook the claw-shaped ends 32, 32 in the top side of the object to be moved, after which a backward and downward pull is exerted upon the rear ends of the side bars 6, 6, which causes the tentacle arm 30 to draw or pull the barrel, box or other object upon the truck, where it will be firmly held by the gable bolts 10, 12 and 14. By the use of this tentacle arm 30, it is thus seen that objects of various sizes may be readily gripped and pulled back upon the truck with a great saving of time and force over the old method of using the hands for this purpose. With my truck it is unnecessary to first tip the barrel, box or other object to be raised to insert the front tongue under it, but instead it is only necessary to bring the angle iron 7 against said barrel, box or other object, hook the tentacle arm 30 over its top and then exert a backward and downward pull upon the handle to draw said barrel, box or other object upon said truck, the gable bolts 10, 12 and 14 serving to prevent said object from slipping off the latter.

I do not wish to be limited to the details of construction and arrangement herein shown and described, and any changes or modifications may be made therein within the scope of the subjoined claim.

Having described my invention, I claim:

A hand truck comprising a pair of side bars, a pair of wheels for supporting said bars at their forward ends, an end and an intermediate cross bar secured to the rear portions of said side bars, a bar extending from the rear cross bar to, and slightly beyond, the intermediate cross bar, a link pivotally secured to the front end of said bar, that extends beyond the intermediate cross bar, and a tentacle arm pivotally secured to said link below said cross and side bars, whereby its front end may be thrust between the latter and hooked over the object to be moved, to draw it upon the cross and side bars when a backward and downward pull is exerted upon the rear ends of the latter.

In testimony whereof I have hereunto set my hand this 3rd day of April, 1918.

BENEDICT E. WILLETT.

Witness:
HOWARD S. SMITH.